United States Patent [19]

Bergloff

[11] Patent Number: 4,648,490
[45] Date of Patent: * Mar. 10, 1987

[54] SHOCK ABSORBER

[75] Inventor: Raymond A. Bergloff, Woodland Hills, Calif.

[73] Assignee: HR Textron Inc., Valencia, Calif.

[*] Notice: The portion of the term of this patent subsequent to Jul. 1, 2003 has been disclaimed.

[21] Appl. No.: 749,257

[22] Filed: Jun. 27, 1985

Related U.S. Application Data

[63] Continuation-in-part of Ser. No. 505,526, Jun. 17, 1983, Pat. No. 4,597,548.

[51] Int. Cl.$^4$ ............................................. F16F 9/19
[52] U.S. Cl. ................................. 188/297; 267/64.15
[58] Field of Search ............... 188/279, 297, 299, 286, 188/287; 244/104 R, 104 FP; 267/11 R, 11 A, 64.15, 64.22

[56] References Cited

U.S. PATENT DOCUMENTS 2,655,232 10/1953 Etherton ................... 244/104 FP X
3,458,016 7/1969 Keech ......................... 244/104 R X
3,696,894 10/1972 Brady et al. .................... 188/297 X
4,061,295 12/1977 Somm ............................ 244/104 FP Primary Examiner—Duane A. Reger
Attorney, Agent, or Firm—Nilsson, Robbins, Dalgarn, Berliner, Carson & Wurst

[57] ABSTRACT

Shock absorbing apparatus includes a pair of fluid containing chambers defined by a pair of telescoping cylinders. Fluid flows from one of the chambers to another through a metering orifice proportional to the differential in pressure generated by impact loads to which the shock absorber is subjected. Upon the differential pressure exceeding a predetermined threshold level an additional flow path positioned in parallel to the metering orifice is opened by an amount proportional to the amount of differential pressure in excess of the threshold to thereby maintain a substantially constant load on the device to which the shock absorber is attached irrespective of impact loads imparted thereto.

4 Claims, 5 Drawing Figures

SHOCK ABSORBER

REFERENCE TO RELATED APPLICATION

This application is a continuation-in-part of application of Ser. No. 505,526 filed June 17, 1983, now U.S. Pat. No. 4,597,548.

BACKGROUND OF THE INVENTION AND DESCRIPTION OF THE PRIOR ART

This invention relates to shock absorbers which may be used in many applications. For example, only the shock absorber may be used upon landing gear, particularly those on aircraft, as part of the recoil mechanism for heavy artillery, as part of the coupling apparatus on railroad cars, as part of a tank stabilizing apparatus and the like. The shock absorber includes a resilient element such as an enclosed quantity of gas which is loaded by a movable wall formed as part of a cylinder telescoping within an additional cylinder to absorb shocks imparted by movement of the load. For purposes of clarity and ease of description only emphasis will be placed upon the shock absorber as applied to aircraft landing gear.

In a conventional aircraft shock absorber strut the vertical kinetic energy of an aircraft impacting the runway during landing is absorbed by a hydraulic shock absorber. The absorption of the shock occurs by fluid being forced through an orifice under the pressure generated from the forces created by the landing gear impacting the runway and compressing the shock strut. The function of the shock strut is to spread out the impact shock over the longest possible period of time thereby lowering the level of vertical deceleration to the air frame and producing minimum discomfort to passengers and minimum load on the aircraft structure.

In prior art shock absorber struts this lower level of vertical deceleration has been realized through the utilization of providing a variable damping rate of the shock strut through the use of a variable area orifice through which the fluid passes. This has been accomplished by moving a tapered metering pin of varying diameter into the center of the orifice attached to the moving end of the shock strut. Alternatively, the variation in orifice flow area may be realized by opening or closing a plurality of openings provided in a flow tube. Such prior art apparatus is illustrated in the following U.S. Pat. Nos. 4,007,894, 4,273,303, 2,814,482, 3,888,436, 4,291,850, 4,284,255, 4,088,286, 3,991,863, 3,171,546, 3,140,084, 2,735,674, 2,563,518 and Re. 30,896.

Other prior art apparatus has been developed which takes into consideration the differences in the shocks applied to the aircraft landing gear and thus the shock absorbing struts on landing as opposed to taxiing of the aircraft. One form of such a structure includes two different flow paths for the liquid which is displaced by the forces generated while the aircraft is landing or taxiing. One form of such a structure includes two different flow paths for the liquid which is displaced by the forces generated while the aircraft is landing or taxiing. A selector valve is operable to direct the displaced liquid selectively through one or the other of these flow paths, responsive to either aircraft landing or aircraft taxiing. Each of the flow paths has a flow restricting means to provide the damping required for the aircraft operational status with the particular flow restricting means being different in each instance. Typical of such devices are those shown in U.S. Pat. Nos. 4,065,078 and 4,004,762.

Yet another shock absorber apparatus includes a piston having a flow path including an automatically adjustable orifice therein to thereby effect the desired damping proportional to the pressures generated within the shock absorber by way of the loads supplied to the aircraft landing gear upon landing or taxiing. The adjustable orifice is adjusted by controlling the impedance to the flow of the damping fluid through the orifice through the utilization of a fluidic vortex valve which utilizes small control jets of high pressure fluid injected tangentially into a circular chamber through which the main flow of hydraulic damping fluid passes. The injected high pressure fluid creates a swirling action in the main fluid flow path thus controlling the rate of flow of the fluid through the damping orifice. The fluid pressure to the tangential control jets is controlled by a servovalve which is in turn controlled by an automatic sensing system keyed to the aircraft's vertical acceleration. Such a structure is disclosed in U.S. Pat. No. 3,743,222.

In addition to the foregoing prior art, which was found during a preliminary novelty search, the following additional prior art was cited during the prosecution of the co-pending application Ser. No. 505,526 filed June 17, 1983:

R. A. Keech U.S. Pat. No. 3,458,016;
J. C. Brady et al U.S. Pat. No. 3,696,894;
M. D. Etherton U.S. Pat. No. 2,655,232;
J. Maselet et al U.S. Pat. No. 4,405,119;
P. T. Som U.S. Pat. No. 4,061,295;
British (Messier) 321,035

SUMMARY OF THE INVENTION

A shock absorber including at least two chambers, each containing fluid. At least one of the chambers has a volume which is variable responsive to the application of impact loads to a device within which the shock absorber is incorporated. A pair of parallel fluid flow paths are provided between the two chambers and each includes an orifice therein. The area of at least one of the orifices is variable proportional to the excess load applied to the device beyond a predetermined threshold.

DETAILED DESCRIPTION

The present invention provides a structure which operates in accordance with the conventional aircraft landing gear shock absorber struts so long as the loading is below a predetermined level, that is, telescoping cylinders compress fluid such as gas contained in a portion of one chamber causing fluid such as hydraulic liquid to flow through a restriction orifice thereby to damp the loads applied. The restriction orifice may be affixed or may be mechanically variable as in the prior art. In addition thereto there is provided an additional parallel flow path containing a separate restriction orifice which normally remains closed unless the pressure generated by the applied impact load exceeds a predetermined threshold. Upon the threshold being exceeded, a control valve such as an electrohydraulic servovalve functions to open (vary the area of) the additional restruction orifice by an amount proportional to the excess load applied. By such opening additional fluid is permitted to flow between the chambers thereby maintaining the load experienced by the device at a constant, irrespective of the impact forces applied to it.

Figure 1:
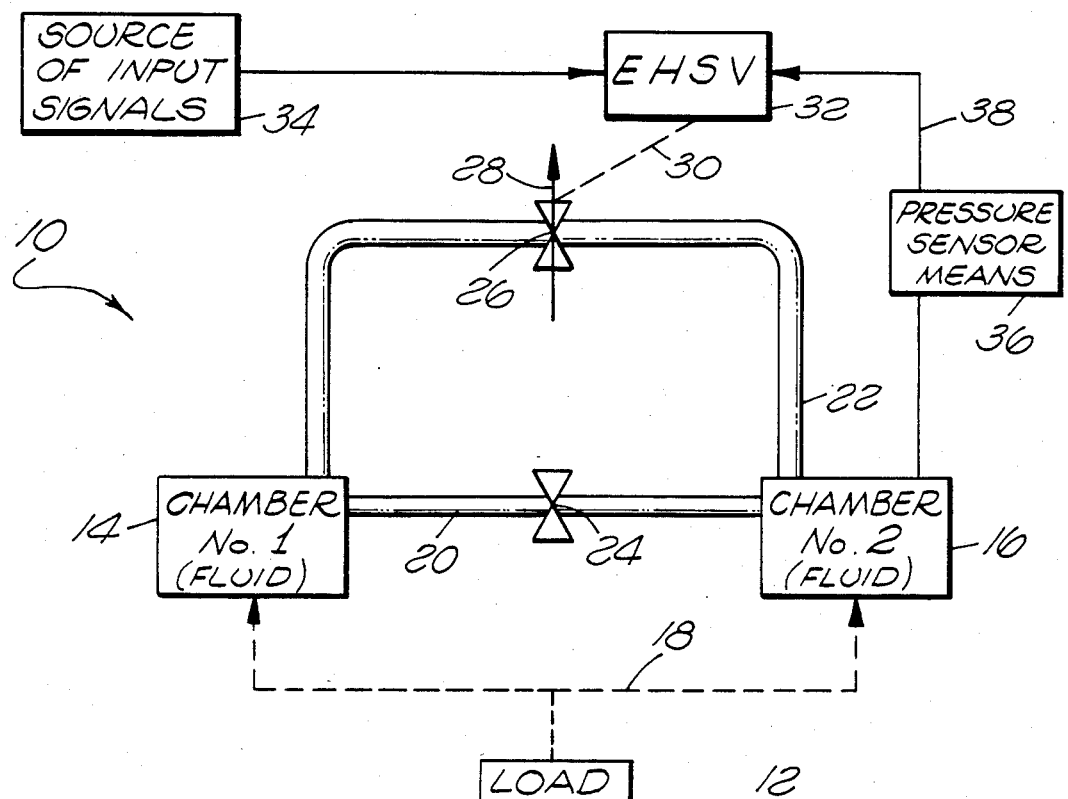
FIG. 1 is a schematic diagram illustrating generally the principles of the present invention.

FIG. 1 discloses, by schematic block diagram, the principles of the present invention. As is therein shown a shock absorber 10 is interposed within a system or device to receive a load 12 generated by impact such as landing an aircraft or firing of heavy artillery. The shock absorber 10 includes first and second chambers 14 and 16 which are connected to receive the impact load as shown by the dashed line 18. Fluid (either gas and/or liquid) is contained within each of the chambers 14 and 16. The chambers are interconnected by a pair of passageways 20 and 22. Passageway 20 includes a restriction orifice 24 while the passageway 22 includes a restriction orifice 26 which is variable as indicated by the arrow 28. A restriction orifice 24 may be fixed or, if desired, may be mechanically variable. The restriction orifice 26 is connected as indicated by the dashed line 30 to a valve such as an electrohydraulic servovalve 32 which varies the amount of opening of the restriction orifice 26. The electrohydraulic servovalve 32 has input signals applied thereto from a source 34 thereof. The source of input signals may include any sources well known to the art such as autopilots, pilot, accelerometers and the like as may be desired in accordance with the particular aircraft or other particular applications. In addition thereto, a pressure sensor means 36 is connected to at least one of the chambers such as the chamber 16 and senses the pressure within that chamber. The amount of pressure is compared to a threshold pre-established within the pressure sensor means and upon that threshold being exceeded, a signal is applied over the lead 38 to the electrohydraulic servovalve 32, causing it to become activated and to open the restriction orifice 26 by an amount which is proportional to the excess pressure sensed within the chamber 16.

From the foregoing it can thus be seen that during the application of normal loads to the device fluid flow between the two chambers is controlled by the single restriction orifice 24 through the passageway 20. Under these circumstances, the loads applied by impact are damped. In the event the loads are excessive, the pressure generated within the chambers is increased dramatically causing the additional parallel flow path to be opened to allow additional flow between the chambers, thereby adding additional damping of the load thereby causing the pressure effectively experienced by the device to be maintained at a constant level, irrespective of the impact imparted to the device.

Figure 2A:
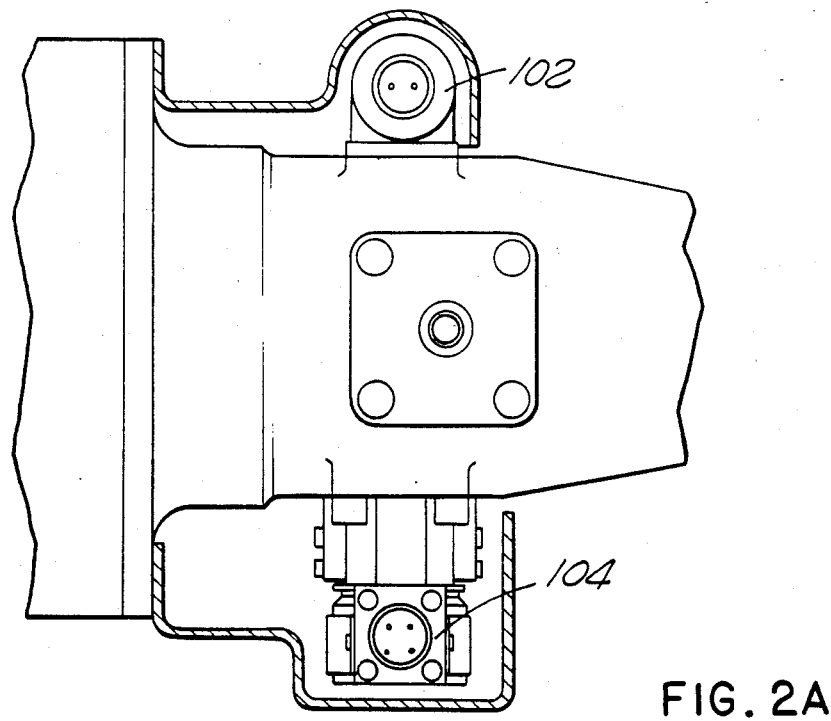
FIGS. 2 and 2A are cross-sectional views, partly schematic, illustrating one form of apparatus incorporating features of the present invention.
Figure 2:
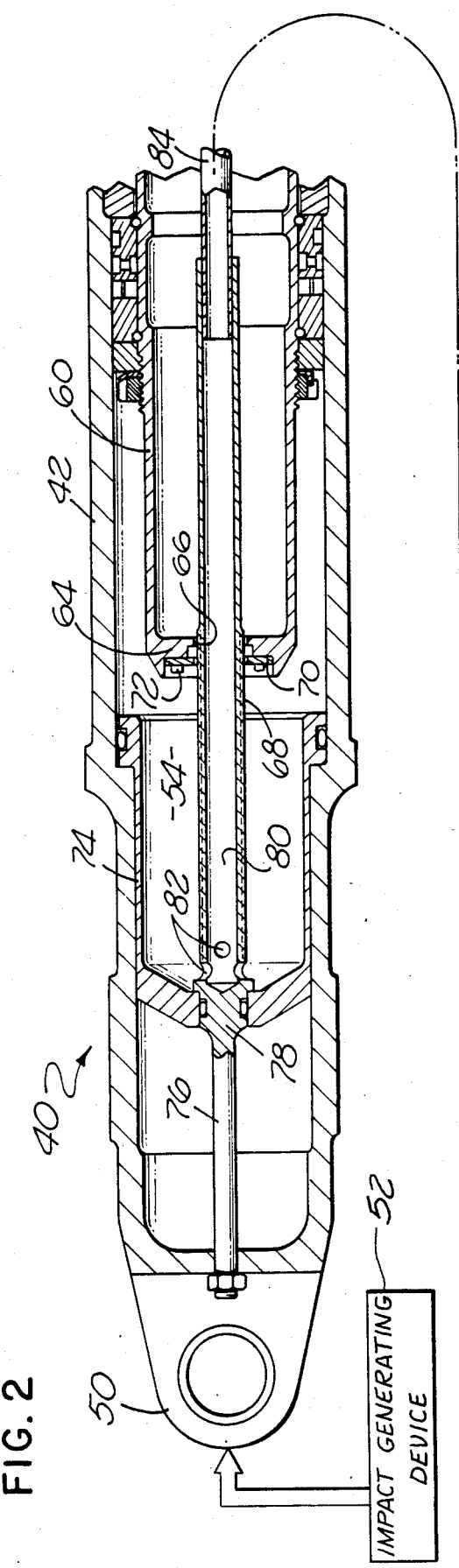
Figure 2:
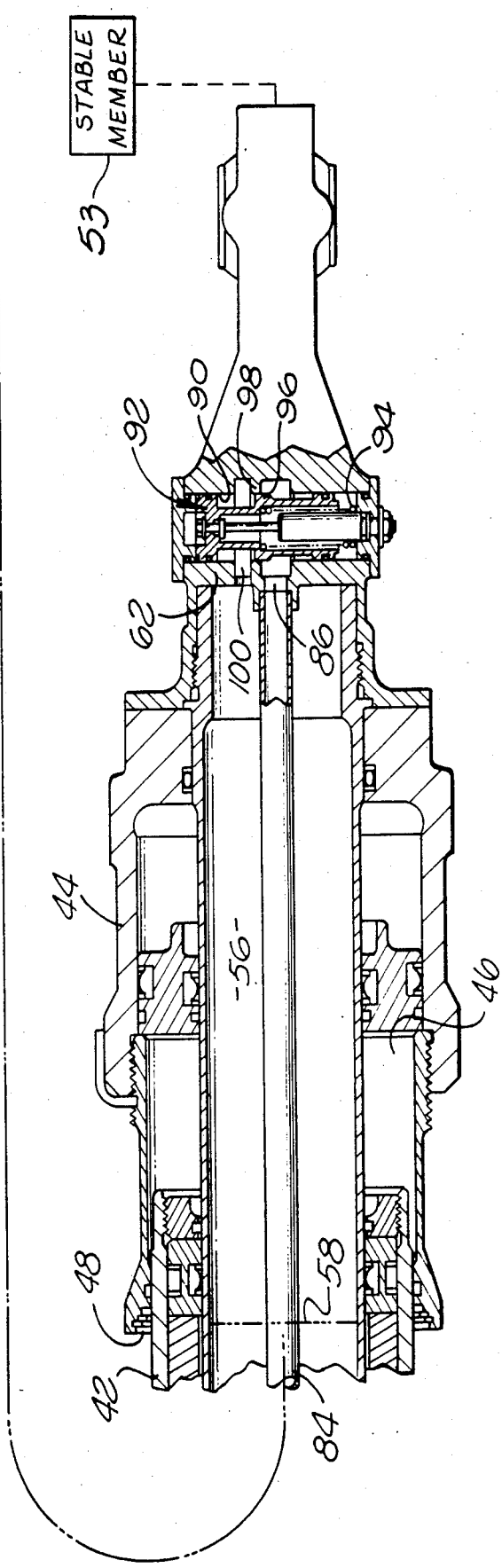

Referring now to FIG. 2 there is illustrated one embodiment of a shock absorber constructed in accordance with the principles of the present invention. As is therein shown the shock absorber 40 includes a cylinder 42 and a cylinder 44 each having an open end 46 and 48, respectively. The cylinders 42 and 44 telescope relative to each other upon the application of impact forces emanating from the impact generating device 51, such as a gun, to the fitting 50 as is illustrated by the arrow 52. The opposite end of the shock absorber 40 is connected to a relatively stable member 53, such as a gun mount.

A first effective chamber is provided at 54 and preferably is filled with hydraulic oil. A second chamber is provided at 56 and preferably is filled with a pressurized gas. It will be noted that the hydraulic oil also is included within a portion of the chamber 56 to a level as illustrated at 58. The two chambers 54 and 56 are effectively divided by the wall 60 which is rigidly affixed to the cylinder 44 at the closed end 62 thereof. The wall 60 terminates in a bulkhead 64 which defines an opening 66 therethrough. Positioned within the opening is a metering pin 68 which defines the size of the opening 66 thus determining the area of the restriction orifice through which the hydraulic oil will flow as described below. Also provided is a plate 70 which is held in position by appropriate fasteners 72 which can be changed as desired to further restrict the effective area of the orifice through which the hydraulic oil flows.

The chamber 54 is defined by the inner wall of the cylinder 42 and a cup-shaped insert 74 which is secured to the fitting 50 of the shock absorber 40 by the rod 76. The rod 76 includes a fitting 78 to which is secured the metering pin 68. It should be noted that the metering pin also is hollow and provides an oil flow passageway 80 which communicates through openings 82 with the chamber 54. The passageway 80 is continued by an oil transfer tube 84 which provides communication between chambers 54 and 56 in the event of excessive loads. Normally the communication path is closed by a spool valve 92 positioned within a cylinder 90.

The cylinder 90 is defined by the closed end or head portion 62 of the cylinder 44. The cylinder 90 defines enlarged diameter areas 86 and 100 communicating with the oil transfer tube 84 (and ultimately the chamber 54) and the chamber 56 respectively. Positioned slidably within the cylinder 90 is a valve 92 having a land 96. A spring 94 urges the land 96 into engagement with the wall 98 of the cylinder 90 separating the enlarged diameter areas 86 and 100 thereby normally blocking communication therebetween. If the spool 92 moves against the force of the spring 94, communication is provided between the area 86 and 100 through an orifice, the opening of which is defined between the land 96 and the wall 98.

A pressure transducer 102 senses the pressure in the chamber 54 and upon its exceeding a predetermined threshold level, activates a servovalve 104 to apply fluid under pressure to the spool 92, moving it against the force of the spring 94 by an amount porportional to the increased pressure above the threshold to thereby open the flow path between the areas 86 and 100 and thus establish flow between the chambers 54 and 56 in parallel with the flow therebetween through orifice 66.

It will now become apparent to those skilled in the art that when an impact load 52 is applied to the shock absorber 40 the cylinder 42 relatively moves into the cylinder 44 along the open end 48 thereof and extends the wall 60 and bulkhead 64 into chamber 54. Such movement compresses the gas in chamber 56 and also creates a differential pressure between the chambers which is higher in the chamber 54 than in the chamber 56. Such differential pressure causes oil to flow from the chamber 54 to the chamber 56 through the first flow path which contains the restriction orifice 66. If the load applied is sufficiently low the entire damping will be accomplished by flow through the restriction orifice 66.

If the load 52 applied to the shock absorber 40 is sufficiently high and the threshold level established by the pressure transducer 102 setting is exceeded, then the servovalve 104 applies pressure to the spool 92 moving against the force of the spring 94 to open the parallel flow path so that the oil can also flow through the openings 82, through the flow path 80 and between the openings 86 and 100 through the metering orifice defined by the land 96 and the wall 98 opened by the servovalve and to the chamber 56, thus further damping the load which has been applied. When the pressure appearing in the chamber 54 drops below the threshold level the land 96 closes the flow path between the chambers 54 and 56 by way of the valve 92, thus returning all of the flow through the orifice 66.

When the entire differential pressure has been relieved such as, by example, when the aircraft takes off, or the heavy gun starts to return to its rest position, the pressure appearing in the chamber 56 is greater than in the chamber 54 and the flow of oil through the orifice 66 reverses and the shock absorber extends to its fully extended position as shown in FIG. 2.

Figure 3A:
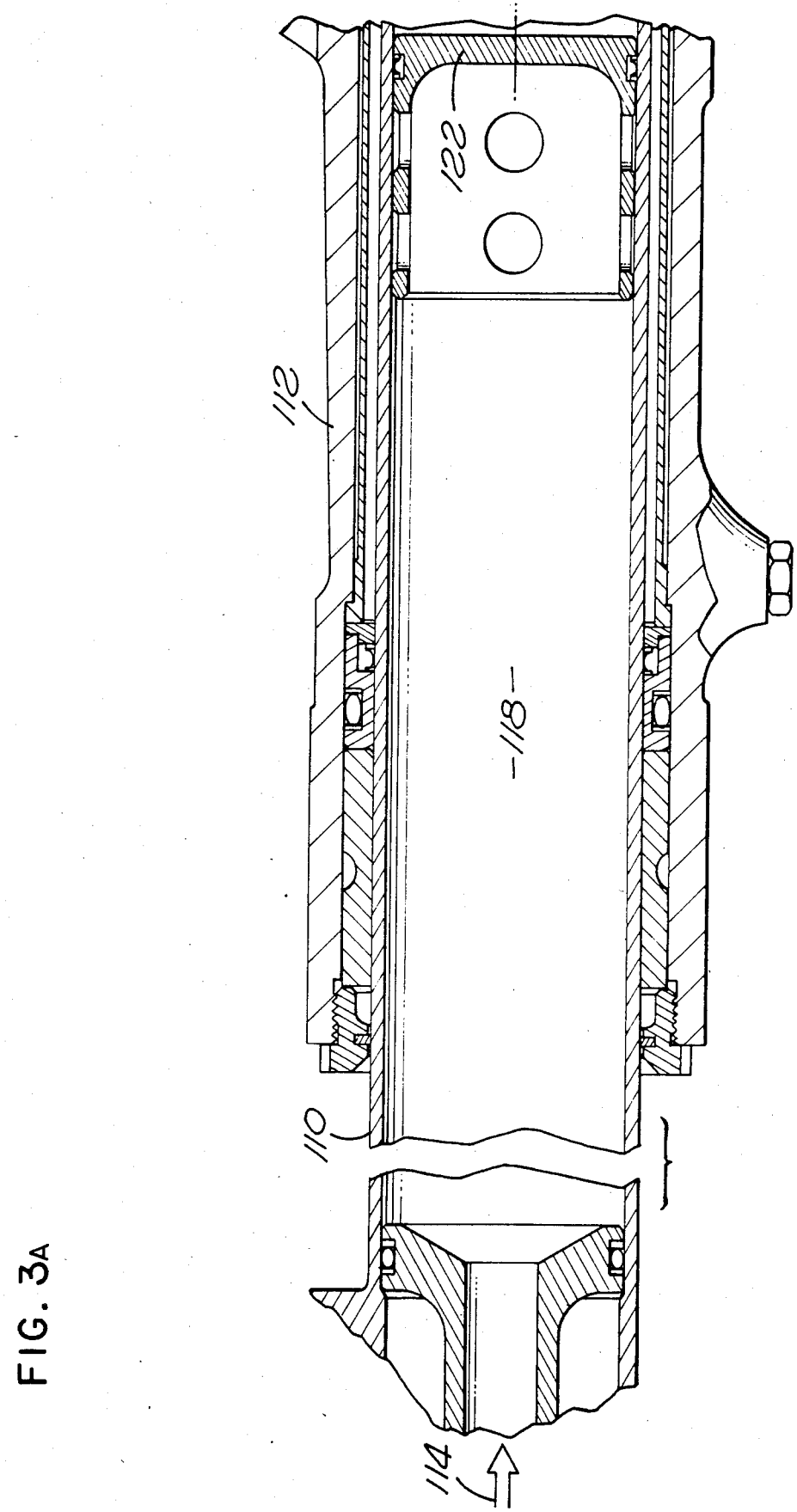
FIG. 3 is a cross-sectional view, partly schematic, illustrating an alternative embodiment including the principles of the present invention.
Figure 3B:
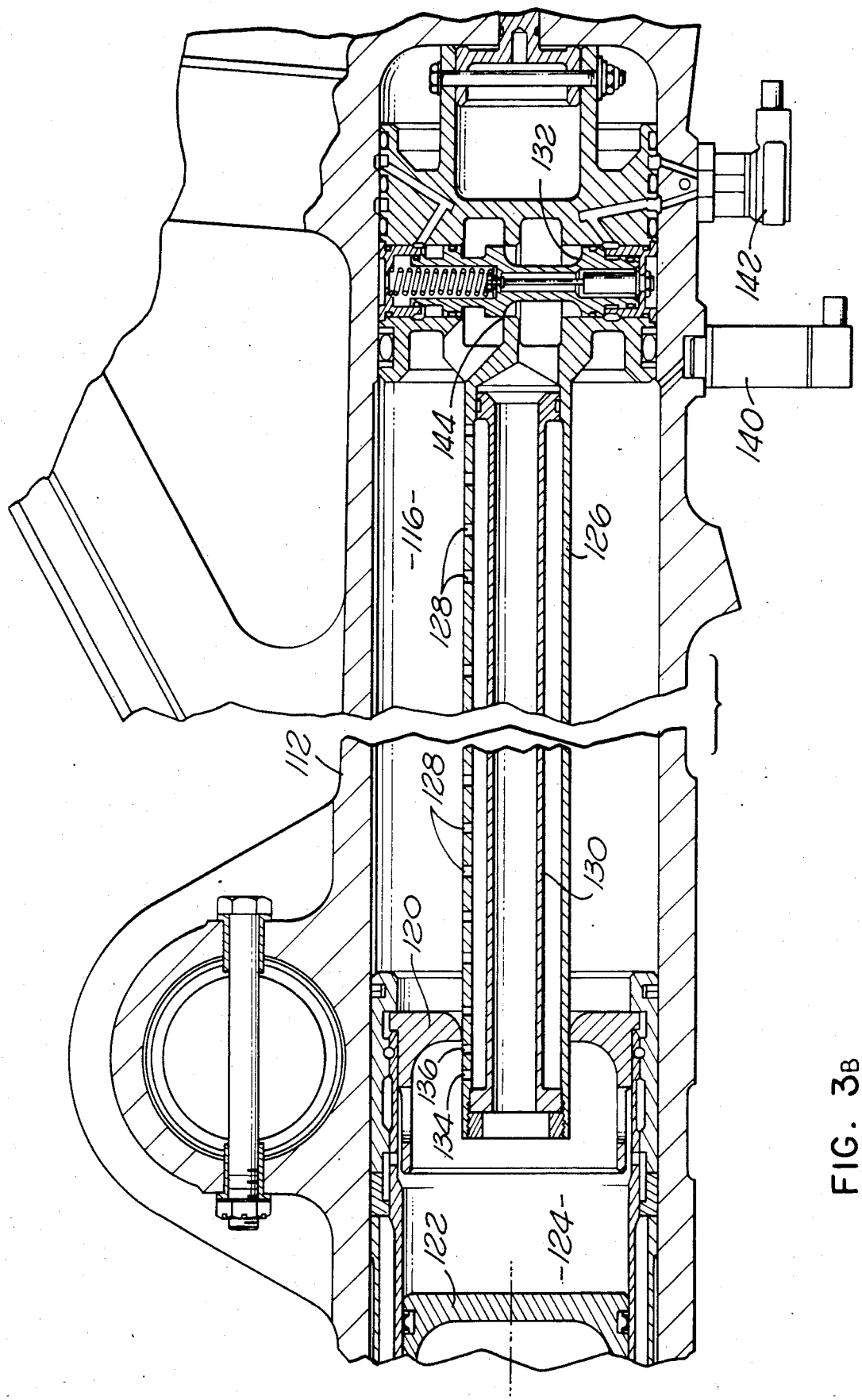

Referring now more particularly to FIG. 3, an alternative embodiment of the shock absorber constructed in accordance with the principles of the present invention is illustrated. The primary differences between the embodiments shown in FIGS. 2 and 3 is that in FIG. 3 the chamber containing the gas is adjacent the impact receiving portion and the orifice providing the flow of hydraulic oil prior to the threshold being exceeded is a variable orifice provided by openings in the metering tube.

As can be seen, a pair of cylinders 110 and 112 are telescopically received and moved relative to each other upon the application of a load 114 to the cylinder 110. A chamber 116 receives oil while a chamber 118 receives gas. The cylinder 110 includes a closed end 120 which functions as a piston to increase the pressure of the oil in chamber 116 upon the application of a load 114 to the cylinder 110. A floating piston 122 is utilized to isolate the gas and oil and defines an additional chamber 124 which contains oil. The metering tube 126 defines a plurality of openings 128 along the wall thereof. An oil transfer tube 130 is disposed internally of the metering tube 128 and communicates between the chamber 124 and a spool 132 which functions precisely the same as the spool 92 of FIG. 2.

In operation of the structure shown in FIG. 3, when a load is applied as shown at 114 the gas in the chamber 118 is compressed thereby increasing the pressure of the oil in chamber 116. The oil then flows through the openings 128 into the area between the metering tube 126 and the oil transfer tube 130. As is noted the closed end 120 on the cylinder 110 has uncovered openings 134 and 136 in the metering tube 126. The number of openings uncovered through the application of the load determines the rate of flow of the oil from the chamber 116 to the chamber 124. Thus it can be seen that these openings as uncovered constitute mechanically controlled a variable orifice to damp the load depending upon the forces applied.

As was the case with FIG. 2, if the forces exceed a predetermined threshold the pressure appearing in chamber 116 is sensed by an appropriate pressure transducer 140 which controls a servovalve 142 to appropriately position the spool 132 and thereby permit flow between chambers 116 and 124 through variable area orifice 144. As will be noted the flow path is from chamber 116, through the orifice 144, through the oil transfer tube and into chamber 124. It should be noted that this flow path is parallel to the flow path through the openings 128, 134 and 136. In addition the area of the orifice 144 is proportional to the amount the pressure in chamber 116 exceeds the threshold pressure.

The invention claimed is:

1. A shock absorber for connection between an impact generating device and a relatively stable member comprising:

a first fluid containing chamber;
a second fluid containing chamber;
means for connecting said first and second chambers between the stable member and the impact generating device;
means for varying the volume of at least one of said chambers responsive to loads applied by said impact generating device;
first fluid flow path means connected between said chambers including a first orifice therein;
second fluid flow path means connected between said chambers in parallel with said first path and including a second orifice therein;
means for varying the area of at least one of said orifices including a spool valve normally blocking said at least one orifice, responsive to the magnitude of said load exceeding a predetermined threshold;
means for sensing the pressure in one of said chambers; and
means connected to said pressure sensing means for producing a signal responsive to said load exceeding said threshold for moving said spool valve to open said orifice, the area of the other of said orifices being independently varied responsive to loads applied to said shock absorber.

2. A shock absorber for connection between an impact generating device and a relatively stable member comprising:

a first fluid containing chamber;
a second fluid containing chamber;
means for connecting said first and second chambers between the stable member and the impact generating device;
means for varying the volume of at least one of said chambers responsive to loads applied by said impact generating device;
first fluid flow path means connected between said chambers including a first orifice therein;
second fluid flow path means connected between said chambers in parallel with said first path and including a second orifice therein; and
spool valve means for varying the area of at least one of said orifices including means for producing an electrical signal responsive to the magnitude of said load exceeding a predetermined threshold;
an electrohydraulic servovalve;
a separate source of input signals for said electrohydraulic servovalve;
means for applying said separate source of signals to said electrohydraulic servovalve, said input signals in combination with said electrical signal positioning said electrohydraulic servovalve to in turn position said spool valve to open said at least one orifice by an amount proportional to the amount said pressure in said one chamber exceeds said threshold.

3. The shock absorber as defined in claim 2 wherein said electrohydraulic servovalve is inactive in the absence of said electrical signal from said pressure sensing means and said spool valve includes spring means biasing said spool valve to a position to close said one orifice in the absence of said electrical signal.

4. The shock absorber as defined in claim 3 wherein said spool valve is disposed to be insensitive to inertial forces generated by said load and thereby remaining in a position to close said one orifice except when said electrical signal is generated.

* * * * *